US009329460B2

(12) United States Patent
Iijima et al.

(10) Patent No.: US 9,329,460 B2
(45) Date of Patent: May 3, 2016

(54) PROJECTOR

(71) Applicant: SEIKO EPSON CORPORATION, Tokyo (JP)

(72) Inventors: Chiyoaki Iijima, Ina (JP); Masakazu Kawamura, Azumino (JP); Yutaka Tsuchiya, Hara-Mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 97 days.

(21) Appl. No.: 14/495,197

(22) Filed: Sep. 24, 2014

(65) Prior Publication Data
US 2015/0103320 A1 Apr. 16, 2015

(30) Foreign Application Priority Data

Oct. 16, 2013 (JP) ................................. 2013-215266
Jun. 16, 2014 (JP) ................................. 2014-123131

(51) Int. Cl.
| G03B 21/20 | (2006.01) |
| H04N 9/31 | (2006.01) |
| G03B 21/00 | (2006.01) |

(52) U.S. Cl.
CPC ............ *G03B 21/006* (2013.01); *G03B 21/204* (2013.01); *G03B 21/208* (2013.01); *G03B 21/206* (2013.01); *H04N 9/3102* (2013.01); *H04N 9/3105* (2013.01); *H04N 9/3108* (2013.01); *H04N 9/3111* (2013.01); *H04N 9/3114* (2013.01); *H04N 9/3117* (2013.01)

(58) Field of Classification Search
CPC .. G03B 21/006; G03B 21/204; G03B 21/206; G03B 21/208; H04N 9/3102; H04N 9/3105; H04N 9/3108; H04N 9/3111; H04N 9/3114; H04N 9/3117
See application file for complete search history.

(56) References Cited

U.S. PATENT DOCUMENTS

| 6,975,294 | B2 | 12/2005 | Manni et al. | |
| 7,692,866 | B2 | 4/2010 | Maximus et al. | |
| 8,337,027 | B2 * | 12/2012 | Ogura | G03B 21/204 353/31 |
| 8,434,875 | B2 * | 5/2013 | Masuda | G02B 26/008 353/30 |
| 8,585,208 | B2 * | 11/2013 | Akiyama | G03B 21/2013 353/31 |
| 8,596,795 | B2 * | 12/2013 | Akiyama | G03B 21/2013 353/122 |
| 8,628,199 | B2 * | 1/2014 | Akiyama | G02B 19/0057 353/38 |

(Continued)

FOREIGN PATENT DOCUMENTS

| CN | 103034035 A | 4/2013 |
| JP | A-4-263244 | 9/1992 |

(Continued)

*Primary Examiner* — Bao-Luan Le
(74) *Attorney, Agent, or Firm* — Oliff PLC

(57) ABSTRACT

A projector includes a light source apparatus, a light modulator that modulates light outputted from the light source apparatus in accordance with image information, and a projection system that projects light modulated by the light modulator. The light source apparatus outputs light formed of first light of a narrow wavelength band having a first wavelength where the optical intensity peaks and second light of a narrow wavelength band having a second wavelength where the optical intensity peaks, and the separation between the first and the second wavelength is set at a value greater than ¼ of one-cycle wavelength of a ripple among ripples contained in an optical spectrum of light that results from the light incident on the light modulator and is reflected off the light modulator, the ripple located in the wavelength regions of the first light and the second light, but smaller than ¾ of the one-cycle wavelength.

7 Claims, 6 Drawing Sheets

(56) References Cited

U.S. PATENT DOCUMENTS

| | | | | |
|---|---|---|---|---|
| 8,757,814 B2* | 6/2014 | Masuda | G02B 26/008 | 353/30 |
| 8,858,000 B2* | 10/2014 | Tsuda | G03B 21/204 | 353/84 |
| 9,010,938 B2* | 4/2015 | Akiyama | G02B 27/142 | 353/34 |
| 9,063,403 B2* | 6/2015 | Tsuda | G03B 21/204 | |
| 2002/0196414 A1 | 12/2002 | Manni et al. | | |
| 2010/0328628 A1* | 12/2010 | Masuda | G02B 26/008 | 353/85 |
| 2011/0043762 A1* | 2/2011 | Miyamae | G03G 21/204 | 353/20 |
| 2011/0051102 A1* | 3/2011 | Ogura | G03B 21/204 | 353/85 |
| 2011/0228232 A1* | 9/2011 | Sakata | G02B 7/008 | 353/31 |
| 2011/0292349 A1* | 12/2011 | Kitano | G03B 21/20 | 353/31 |
| 2012/0002173 A1* | 1/2012 | Akiyama | G03B 21/2013 | 353/30 |
| 2012/0008098 A1* | 1/2012 | Akiyama | G02B 19/0057 | 353/30 |
| 2012/0026469 A1* | 2/2012 | Akiyama | G02B 27/142 | 353/20 |
| 2012/0051044 A1* | 3/2012 | Akiyama | G03B 21/2013 | 362/233 |
| 2012/0133904 A1* | 5/2012 | Akiyama | G02B 27/102 | 353/38 |
| 2012/0236264 A1* | 9/2012 | Akiyama | G03B 21/2013 | 353/37 |
| 2013/0083294 A1 | 4/2013 | Tseng | | |
| 2013/0162952 A1 | 6/2013 | Lippey et al. | | |
| 2013/0293850 A1* | 11/2013 | Masuda | G02B 26/008 | 353/31 |
| 2013/0335709 A1* | 12/2013 | Akiyama | G02B 27/0927 | 353/20 |

FOREIGN PATENT DOCUMENTS

| | | |
|---|---|---|
| JP | A-2004-503923 | 2/2004 |
| JP | A-2006-171722 | 6/2006 |
| JP | A-2012-83695 | 4/2012 |

* cited by examiner

PROJECTOR

BACKGROUND

1. Technical Field

The present invention relates to a projector.

2. Related Art

There is a known projector including a light source apparatus, a light modulator that modulates light outputted from the light source apparatus in accordance with image information, and a projection system that projects the light modulated by the light modulator. Further, there is a proposed projector using a laser light source, for example, for the purpose of prolonging the life of the light source apparatus (see JP-A-2012-83695, for example).

The projector described in JP-A-2012-83695 includes a light source apparatus having a laser light source that emits blue light (excitation light), a light emitting device, a color separation system, liquid crystal light valves provided as light modulators for three types of color light (blue light, green light, and red light), a light combining element, and a projection system.

The light emitting device has a function of transmitting part of the blue light emitted from the laser light source and absorbing the remainder of the blue light and converting it into yellow light.

The liquid crystal light valve for blue light modulates the blue light emitted from the laser light source. The liquid crystal light valve for green light and the liquid crystal light valve for red light modulate green light and red light emitted from the light emitting device and separated by the color separation system. The light beams modulated by the liquid crystal light valves are combined with one another by the light combining element, and the combined light exits out of the projection system.

However, in the technology described in JP-A-2012-83695, in which the blue light emitted from the laser light source is narrow wavelength band light, interference fringes can be produced in the display area of the liquid crystal light valve irradiated with the blue light. That is, since a liquid crystal light valve has a multilayer structure in which a pair of substrates, electrodes, a liquid crystal material, and other components are stacked on each other, part of light incident on the liquid crystal light valve is reflected off the members described above and experiences multiple beam interference, and the optical spectrum of the light reflected off the liquid crystal light valve shows a phenomenon in which small amplitude waves are continuously produced (ripple). The reflected light, the intensity of which at a wavelength varies in accordance with variation in the thickness of each of the members that form the liquid crystal light valve, produces a ripple that causes optical intensity at the same wavelength to vary in accordance with the variation in the display area. As a result, at the wavelength of the light emitted from the laser light source, a portion where the reflected light has high intensity and a portion where the reflected light has low intensity are produced in the display area of the liquid crystal light valve, undesirably resulting in interference fringes in the display area of the liquid crystal light valve and hence brightness unevenness and color unevenness in a projected image.

SUMMARY

An advantage of some aspects of the invention is to solve at least a part of the problems described above, and the invention can be implemented as the following forms or application examples.

Application Example 1

A projector according to this application example includes a light source apparatus that outputs light, a light modulator that modulates the light outputted from the light source apparatus in accordance with image information, and a projection system that projects light modulated by the light modulator. The light source apparatus outputs light formed of first narrow wavelength band light the optical intensity of which peaks at a first wavelength and second narrow wavelength band light the optical intensity of which peaks at a second wavelength, and the separation between the first wavelength and the second wavelength is set at a value greater than ¼ of one-cycle wavelength of a ripple among ripples contained in an optical spectrum of light that results from the light incident on the light modulator and exits out thereof, the ripple falling within regions in the vicinity of the first wavelength and the second wavelength, but smaller than ¾ of the one-cycle wavelength.

With reference to the peak wavelengths of the incident narrow wavelength band light, the difference in intensity between reflected light (exiting light) beams in the display area of the light modulator is maximized in a portion where a ripple wave with a peak of the wave (where reflected light has high intensity) is produced and in a portion where a ripple wave with a valley of the wave (where reflected light has low intensity) is produced.

According to the configuration described above, the light source apparatus outputs light having a first wavelength and a second wavelength which are separated by a distance greater than ¼ of one-cycle wavelength of a ripple (hereinafter referred to as "ripple wavelength") but smaller than ¾ of the ripple wavelength and where the optical intensity peaks. That is, for example, a ripple wave having a peak of the wave at the first wavelength has a valley of the wave at the second wavelength separated from the first wavelength by a value greater than ¼ of the ripple wavelength but smaller than ¾ thereof. A ripple wave having a valley of the wave at the first wavelength has a peak of the wave at the second wavelength separated from the first wavelength by a value greater than ¼ of the ripple wavelength but smaller than ¾ thereof.

As a result, in the display area of the light modulator, in a portion where one of the first light having the first wavelength and the second light having the second wavelength forms enhanced reflected light but the other one of the first light and the second light forms weakened reflected light, whereas in a portion where the one of the first light and the second light forms weakened reflected light but the other one of the first light and the second light forms enhanced reflected light. Variation in the intensity of the reflected light (exiting light) in the display area of the light modulator can be reduced, whereby interference fringes in the light modulator can therefore be suppressed and hence brightness unevenness and color unevenness of a projected image can be suppressed.

Application Example 2

In the projector according to the application example described above, it is preferable that the light modulator is a liquid crystal panel.

Since a liquid crystal panel has a multilayer structure in which a pair of substrates, a liquid crystal material, electrodes, and other components are layered on each other, and variation in thickness of each of the members described above is likely to be large, a large amount of interference fringes may also be produced.

Since the thus configured projector includes the light source apparatus described above, interference fringes in the display area of the liquid crystal panel can be suppressed, and brightness unevenness and color unevenness of a projected image can be suppressed.

Application Example 3

In the projector according to the application example described above, it is preferable that the light modulator is a reflective liquid crystal panel.

According to the configuration described above, in which a reflective liquid crystal panel that uses reflected light is used as the light modulator, using the light source apparatus described above allows more efficient suppression of variation in intensity of the reflected light (exiting light) in a display area of the reflective liquid crystal panel. Therefore, interference fringes in the display area of the reflective liquid crystal panel can be suppressed and brightness unevenness and color unevenness of a projected image can be suppressed.

Application Example 4

In the projector according to the application example described above, it is preferable that the light source apparatus includes a laser light source that emits the first light and a laser light source that emits the second light.

According to the configuration described above, since the laser light sources that form the light source apparatus output light having the first light and the second light, the light source apparatus can have a prolonged life and can output light having the first wavelength and the second wavelength separated by a value greater than ¼ of the ripple wavelength but smaller than ¾ thereof.

Application Example 5

In the projector according to the application example described above, it is preferable that the first wavelength and the second wavelength are within a wavelength region to which blue light belongs.

According to the configuration described above, interference fringes in the display area of the light modulator that modulates blue light can be suppressed.

Application Example 6

In the projector according to the application example described above, it is preferable that the first light has a wavelength band of a width of 10 nm or smaller over which the optical intensity is at least one-half the optical intensity at the first wavelength, and that the second light has a wavelength band of a width of 10 nm or smaller over which the optical intensity is at least one-half the optical intensity at the second wavelength.

According to the configuration described above, since the width of each of the wavelength bands (effective wavelength regions) described above is 10 nm or smaller, setting the first light and the second light in such a way that the separation between the first wavelength and the second wavelength is greater than 10 nm allows the optical intensities of the first light and the second light to peak at the first wavelength and the second wavelength respectively, whereby interference fringes resulting from ripples in the light modulator can be suppressed.

Application Example 7

In the projector according to the application example described above, it is preferable that the light source apparatus includes a first light source apparatus having a first light source that emits first color light formed of the first light and the second light and a light diffuser that diffuses the first color light emitted from the first light source and a second light source apparatus having a second light source that emits excitation light and a fluorophore that converts the excitation light into light containing second color light, and the light modulator includes a first light modulator that modulates the first color light and a second light modulator that modulates the second color light.

According to the configuration described above, since the projector includes the first light source apparatus that outputs the first color light and the second light source apparatus that outputs the second color light, the intensity of each of the color light beams can be readily controlled.

Further, since the first light source apparatus outputs the first color light formed of the first light and the second light described above, interference fringes in the first light modulator can be suppressed.

Since the second light source apparatus outputs light containing the second color light from the fluorophore excited by the excitation light, the second color light can have a wideband wavelength wider than the ripple wavelength. Therefore, in the light modulator that modulates the second color light, substantially no interference fringes are produced.

The projector therefore allows the intensities of the first color light and the second color light to be balanced in a satisfactory manner and can project an image with brightness unevenness and color unevenness suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

A projector according to an embodiment of the invention will be described below with reference to the drawings.

The projector according to the present embodiment modulates light outputted from two illumination apparatus in accordance with image information and enlarges and projects the modulated light on a screen or any other projection surface.

Configuration of Optical System

Figure 1:
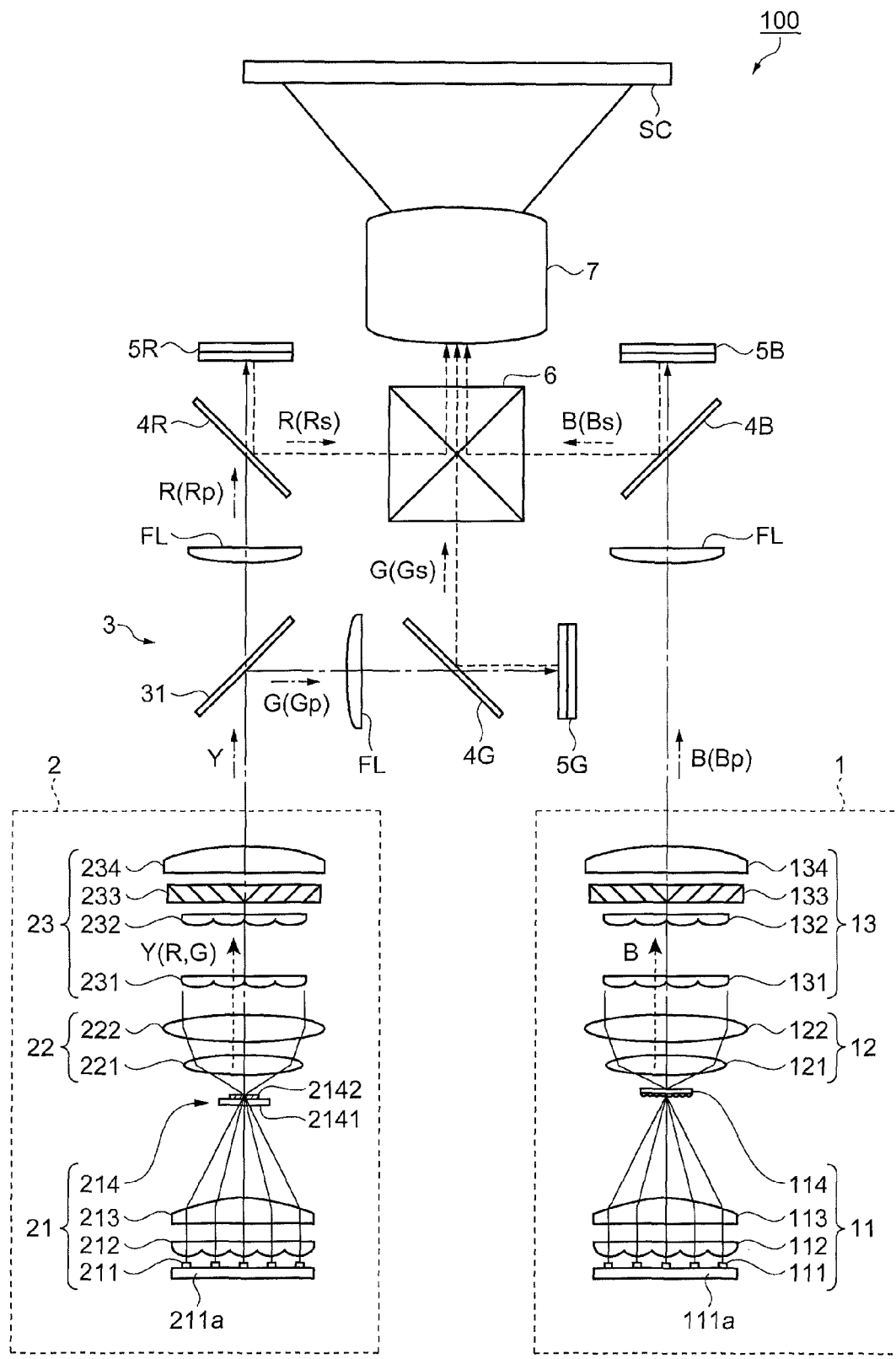
FIG. 1 is a diagrammatic view showing the optical system of a projector according to an embodiment of the invention.

FIG. 1 is a diagrammatic view showing the optical system of a projector 100 according to the present embodiment.

The projector 100 includes a first illumination apparatus 1, a second illumination apparatus 2, a color separation system 3, three field lenses FL, reflective polarizers 4R, 4G, and 4B, liquid crystal light valves 5R, 5G, and 5B as light modulators, a cross dichroic prism 6, and a projection lens 7 as a projection system, as shown in FIG. 1. The liquid crystal light valve 5B corresponds to a first light modulator, and the liquid crystal light valve 5G corresponds to a second light modulator. Although not shown, in addition to the optical system described above, the projector 100 further includes a controller that controls the action of the projector 100, a power supply that supplies each portion of the projector 100 with electric power, a cooler that cools the optical system and the power supply, and an exterior enclosure that accommodates the portions described above.

The first illumination apparatus 1 includes a first light source apparatus 11, a first pickup system 12, and a first optical integration system 13.

The first light source apparatus 11 includes a first light source 111, a collimator lens array 112, a light collection system 113, and a light diffuser 114 and outputs blue light (hereinafter referred to as "B light"). The B light corresponds to first color light.

The first light source 111 has a plurality of laser light sources that are mounted on a substrate 111a.

Figure 2A:
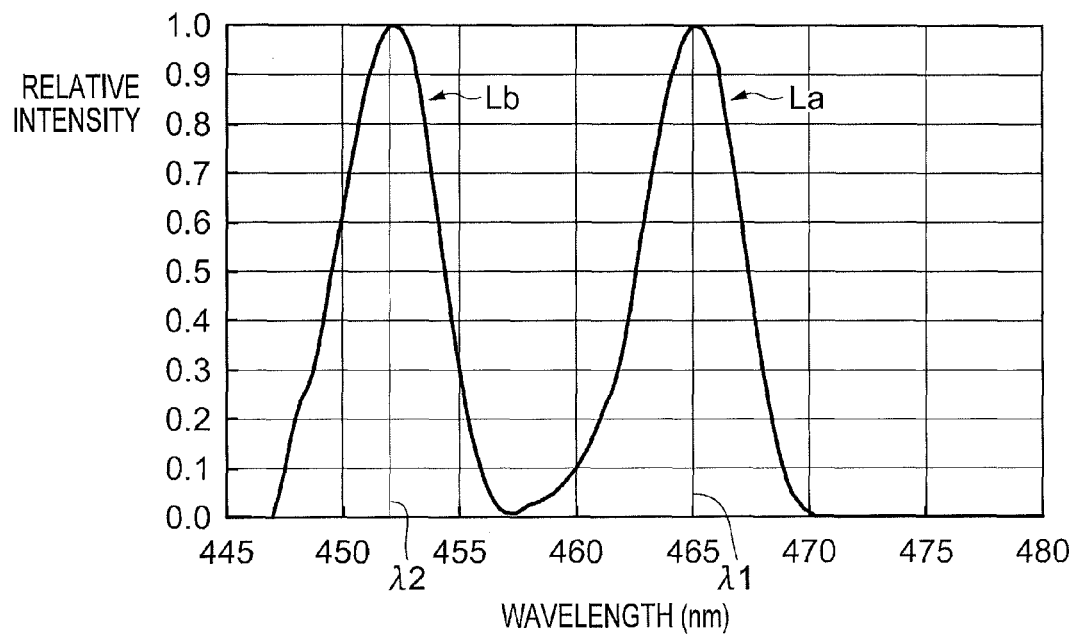
FIG. 2A shows a spectrum of light outputted from a first light source apparatus in the present embodiment.
Figure 2B:
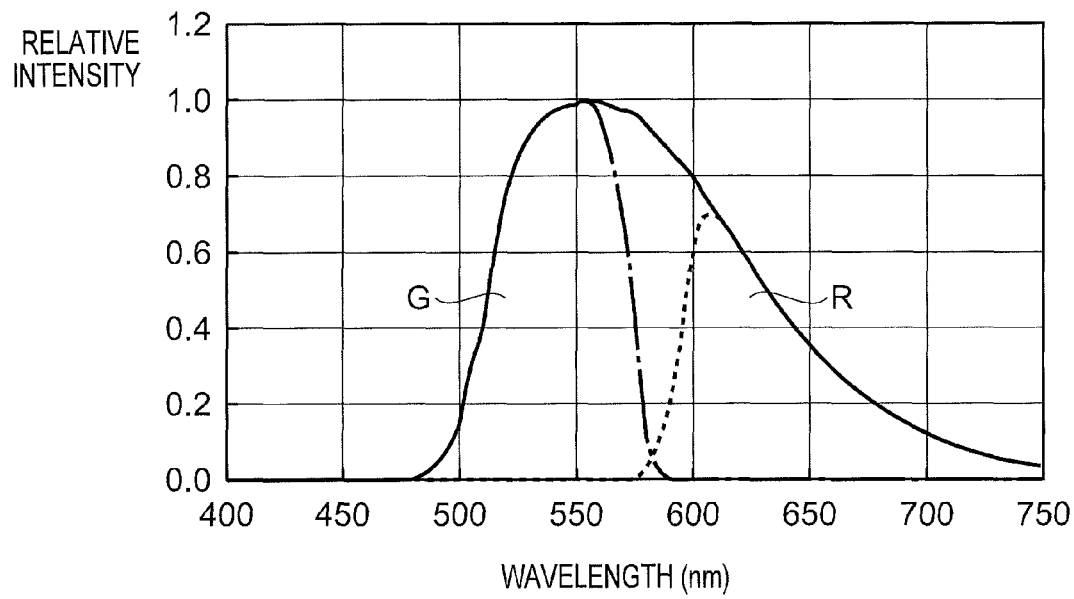
FIG. 2B shows a spectrum of light outputted from a second light source apparatus in the present embodiment.

FIGS. 2A and 2B show spectra of the light outputted from the first light source apparatus 11 and a second light source apparatus 21 in the second illumination apparatus 2. FIG. 2A shows a spectrum of the light outputted from the first light source apparatus 11, and FIG. 2B shows a spectrum of the light outputted from the second light source apparatus 21.

The first light source 111 is a combination of a plurality of laser light sources that emit light beams that belong to different wavelength bands and outputs light formed of first narrow wavelength band light La, the optical intensity of which peaks at a first wavelength $\lambda 1$, and second narrow wavelength band light Lb, the optical intensity of which peaks at a second wavelength $\lambda 2$, as shown in FIG. 2A. The first light source apparatus 11, which outputs light formed of the first light La and the second light Lb, which belong to two separate narrow wavelength bands, suppresses interference fringes produced in the liquid crystal light valve 5B, which modulates the first light La and the second light Lb. The reason why the first light source apparatus 11, which outputs the two narrow wavelength band light beams, suppresses interference fringes will be described later in detail.

The collimator lens array 112 has a plurality of lenses corresponding to the plurality of laser light sources in the first light source 111, and the plurality of lenses substantially parallelize the light beams emitted from the respective laser light sources.

The light collection system 113 focuses light beams from the collimator lens array 112 onto the light diffuser 114. In FIG. 1, the light collection system 113 is drawn in the form of one lens but may instead be formed of a plurality of lenses.

The light diffuser 114 has a plurality of microlenses and diffuses and transmits light beams having exited out of the light collection system 113.

The first pickup system 12 includes a first lens 121 and a second lens 122, substantially parallelizes light having exited out of the light diffuser 114, and causes the substantially parallelized light to exit toward the first optical integration system 13. The number of lenses that form the first pickup system 12 is not limited to two and may be one or three or more.

The first optical integration system 13 includes a first lens array 131, a second lens array 132, a polarization conversion element 133, and a superimposing lens 134, as shown in FIG. 1.

The first lens array 131 has a plurality of lenslets arranged in a matrix and divides the light from the first pickup system 12 into a plurality of sub-light beams.

The second lens array 132 is disposed on the light exiting side of the first lens array 131 and has a plurality of lenslets that face the plurality of lenslets in the first lens array 131. The second lens array 132, along with the superimposing lens 134, superimposes the sub-light beams on each other on the liquid crystal light valve 5B.

The polarization conversion element 133 converts non-polarized light having exited out of the second lens array 132 into first linearly polarized light.

The second illumination apparatus 2 includes a second light source apparatus 21, a second pickup system 22, and a second optical integration system 23, as shown in FIG. 1.

The second light source apparatus 21 includes a second light source 211, a collimator lens array 212, a light collection system 213, and a fluorescence emitter 214 and outputs yellow light (hereinafter referred to as "Y light") containing red light (hereinafter referred to as "R light") and green light (hereinafter referred to as "G light") as shown in FIG. 2B. The G light corresponds to second color light.

The second light source 211 has a plurality of laser light sources that emit B light (for example, intensity of emitted light peaks at about 440 nm) as excitation light and are mounted on a substrate 211a. The second light source 211 may have the same configuration as that of the first light source 111. The second light source 211 may instead be a device that does not emit blue light but emits light that belongs to a wavelength band including violet light or ultraviolet light.

The collimator lens array 212 has a plurality of lenses corresponding to the plurality of laser light sources, and the plurality of lenses substantially parallelize the light beams emitted from the respective laser light sources, as the collimator lens array 112 does.

The light collection system 213 focuses light beams from the collimator lens array 212 onto the fluorescence emitter 214, as the light collection system 113 does. The light collection system 213 may be formed of a plurality of lenses, as the light collection system 113 is.

The fluorescence emitter 214 has a transparent member 2141 and a fluorophore 2142.

The transparent member 2141 is made of quartz glass or any other optical glass material and has a plate-like shape.

The fluorophore 2142 is disposed on the transparent member 2141 and converts the excitation light emitted from the second light source 211 and traveling via the collimator lens array 212 and the light collection system 213 into Y light containing R light and G light. The fluorophore 2142 is formed, for example, of a layer containing $(Y, Gd)_3(Al, Ga)_5O_{12}$:Ce, which is a YAG-based (yttrium-aluminum-garnet-based) fluorophore. The fluorescent layer may instead be a layer, containing any other YAG-based fluorophore or a layer containing a non-YAG fluorophore (silicate-based fluorophore or TAG-based fluorophore, for example). Still instead, the fluorescent layer may be a layer containing a mixture of a fluorophore that converts the excitation light into R light ($CaAlSiN_3$ red fluorophore, for example) and a fluorophore that converts the excitation light into G light (β-sialon green fluorophore, for example).

The second pickup system 22 includes a first lens 221 and a second lens 222, as the first pickup system 12 does, substantially parallelizes the light having exited out of the fluorescence emitter 214, and causes the substantially parallelized light to exit toward the second optical integration system 23.

The second optical integration system 23 includes a first lens array 231, a second lens array 232, a polarization conversion element 233, and a superimposing lens 234, as the first optical integration system 13 does, and has a function of dividing the light from the second pickup system 22 into a plurality of sub-light beams and superimposing the divided sub-light beams on each other on the liquid crystal light valves 5G and 5R.

The polarization conversion element 233 converts non-polarized light having exited out of the second lens array 232 into the first linearly polarized light.

The color separation system 3 includes a dichroic mirror 31, which separates the Y light from the second illumination apparatus 2 into the R light and the G light. Specifically, the dichroic mirror 31 receives the Y light having exited out of the second optical integration system 23 and reflects the G light out of the Y light and transmits the R light out thereof.

The three field lenses FL are disposed on the light incident side of the reflective polarizers 4R, 4G, and 4B, respectively.

The B light having exited out of the first illumination apparatus 1 is incident on the reflective polarizer 4B via the corresponding field lens FL.

The G light reflected off the dichroic mirror 31 is incident on the reflective polarizer 4G via the corresponding field lens FL.

The R light having passed through the dichroic mirror is incident on the reflective polarizer 4R via the corresponding field lens FL.

The reflective polarizer 4B transmits the first linearly polarized light (P-polarized light, for example) from the polarization conversion element 133, which aligns polarization directions with each other, and reflects second linearly polarized light (S-polarized light, for example) having a polarization direction perpendicular to that of the first linearly polarized light. The reflective polarizers 4G and 4R transmit the first linearly polarized light from the polarization conversion element 233, which aligns polarization directions with each other, and reflects the second linearly polarized light having a polarization direction perpendicular to that of the first linearly polarized light. Retardation plates may be disposed in positions on the optical path upstream of the reflective polarizers 4R, 4G, and 4B or in positions on the optical path downstream thereof, so that the reflective polarizers 4R, 4G, and 4B transmit the second linearly polarized light and reflect the first linearly polarized light.

Each of the liquid crystal light valves 5R, 5G, and 5B has a reflective liquid crystal panel.

The liquid crystal panel has a structure in which a liquid crystal layer is sandwiched between substrates facing each other. Reflective pixel electrodes to which TFTs (thin film transistors) or any other switching devices are connected are formed in a matrix on one of the substrate or a device substrate, and a counter electrode is formed on the other substrate (counter substrate).

The liquid crystal panel modulates light incident thereon as follows: A voltage is applied between the reflective pixel electrodes and the counter electrode in accordance with a drive signal from the controller to control the orientation of the liquid crystal molecules.

The liquid crystal light valves 5R, 5G, and 5B modulate P-polarized light (Rp, Gp, and Bp) having passed through the reflective polarizers 4R, 4G, and 4B into S-polarized light (Rs, Gs, and Bs) in accordance with image information and reflect the modulated light toward the reflective polarizers 4R, 4G, and 4B. The color light beams modulated by the liquid crystal light valves 5R, 5G, and 5B and reflected off the reflective polarizers 4R, 4G, and 4B are directed toward the cross dichroic prism 6.

The cross dichroic prism 6 is formed by bonding four rectangular prisms and hence has a substantially square shape in a plan view, and two dielectric multilayer films are formed on the interfaces between the bonded rectangular prisms. In the cross dichroic prism 6, the dielectric multilayer films reflect the R light and the B light having exited out of the liquid crystal light valves 5R and 5B and transmit the G light having exited out of the liquid crystal light valve 5G to combine the color light beams with one another and cause the combined light to exit out of the cross dichroic prism 6.

The projection lens 7 includes a plurality of lenses (not shown) and enlarges and projects the combined light from the cross dichroic prism 6 on a screen SC or any other projection surface.

Details of First Light Source Apparatus

A description will now be made of the process in which the two types of narrow wavelength band light outputted from the first light source apparatus 11 suppress interference fringes in the liquid crystal light valve 5B.

First, as a comparative example with respect to the first light source apparatus 11 in the present embodiment, a description will be made of a case where using a light source apparatus of related art that outputs narrow wavelength band light causes interference fringes to be produced in the liquid crystal panel in the liquid crystal light valve 5B.

Figure 3:
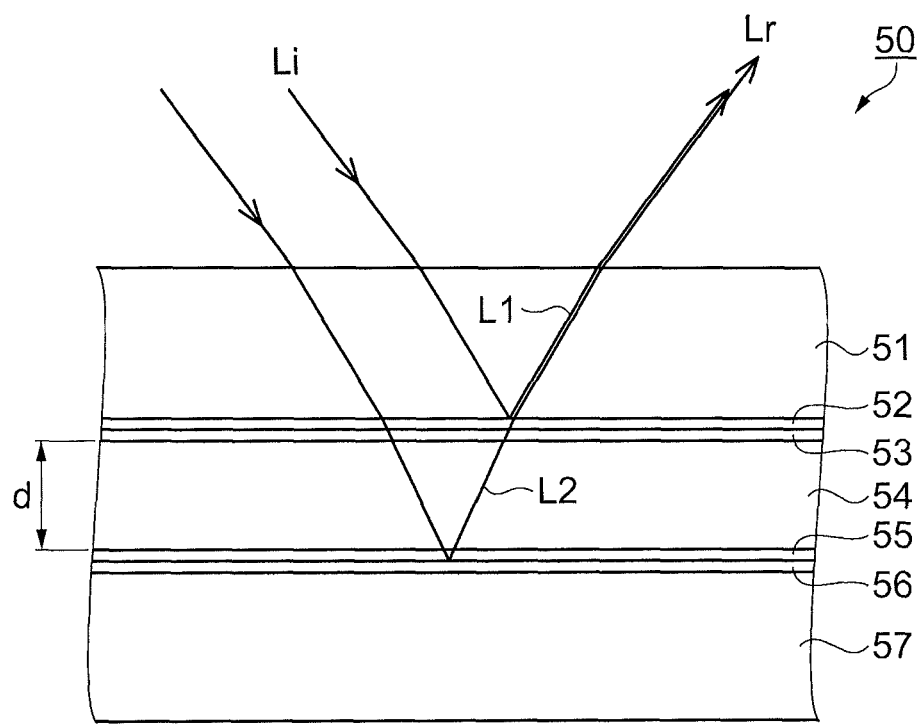
FIG. 3 is a cross-sectional view diagrammatically showing a liquid crystal panel in the present embodiment.

FIG. 3 is a cross-sectional view diagrammatically showing a liquid crystal panel 50 in each of the liquid crystal light valves 5R, 5G, and 5B.

The liquid crystal panel 50 has a multilayer structure in which a counter substrate 51, a counter electrode 52, an orientation film 53, a liquid crystal material 54, an orientation film 55, a reflective pixel electrode 56, a device substrate 57, and other members having refractive indices different from one another are layered on each other, as shown in FIG. 3. For example, the counter substrate 51 and the device substrate 57 are made, for example, of a glass material. The counter electrode 52 is made of ITO (indium tin oxide) or any other transparent conductive material. The reflective pixel electrode 56 is made of aluminum, silver, an alloy thereof, or any other metal having high optical reflectance. The orientation films 53 and 55 are made, for example, of an inorganic material.

The fact that the liquid crystal panel 50 has the multilayer structure causes multiple beam interference when light incident on the liquid crystal panel 50 is reflected therein. For example, incident light Li incident on the liquid crystal panel 50 is partially reflected off the counter electrode 52 (light L1), and the reflected light interferes with light L2 reflected off the reflective pixel electrode 56 and exits as reflected light Lr out of the liquid crystal panel 50, as shown in FIG. 3.

The optical intensity of the reflected light Lr varies as the wavelength of the incident light Li varies. That is, the optical intensity increases at a wavelength that allows the wave of the light L1 and the wave of the light L2 travel in phase, whereas the optical intensity decreases at a wavelength that causes the wave of the light L1 and the wave of the light L2 to be out of phase.

Specifically, look at now the layer of the liquid crystal material 54, and let d be the thickness of the layer of the liquid crystal material 54 (inter-substrate gap), n be the refractive index of the liquid crystal material 54, $\lambda$ be the wavelength of light, and m be a natural number. When the condition expressed by the following Expression (1) is satisfied, the optical intensity of the reflected light Lr is maximized, whereas when the condition expressed by the following Expression (2) is satisfied, the optical intensity of the reflected light Lr is minimized.

$$2dn=2(m+1/2) \quad (1)$$

$$2dn=2m \quad (2)$$

In view of the consideration described above, a smooth curve of the optical spectrum of the reflected light Lr produced in the liquid crystal panel 50 in an ideal case where no multiple beam interference occurs actually has a ripple or small amplitude waves continuously produced due to multiple beam interference.

Since the ripple results from the fact that each of the counter electrode 52, the liquid crystal material 54, the orientation films 53 and 55, the reflective pixel electrode 56, and other components has a thickness, the ripple varies when the thickness of each of the members described above in the display area of the liquid crystal panel 50 varies. Therefore, when narrow wavelength band light the wavelength of which is smaller than or equal to the wavelength of one cycle of the ripple (ripple wavelength) is reflected, the intensity of the reflected light Lr varies depending on a position in the display area of the liquid crystal panel 50. That is, when the laser light source of related art is used, interference fringes are produced in the display area of the liquid crystal panel 50, and hence brightness unevenness and color unevenness occur in a projected image. In particular, variation in the thickness of the layer of the liquid crystal material 54 (d in Expressions (1) and (2) described above) is a leading cause of the interference fringes.

Figure 4A:
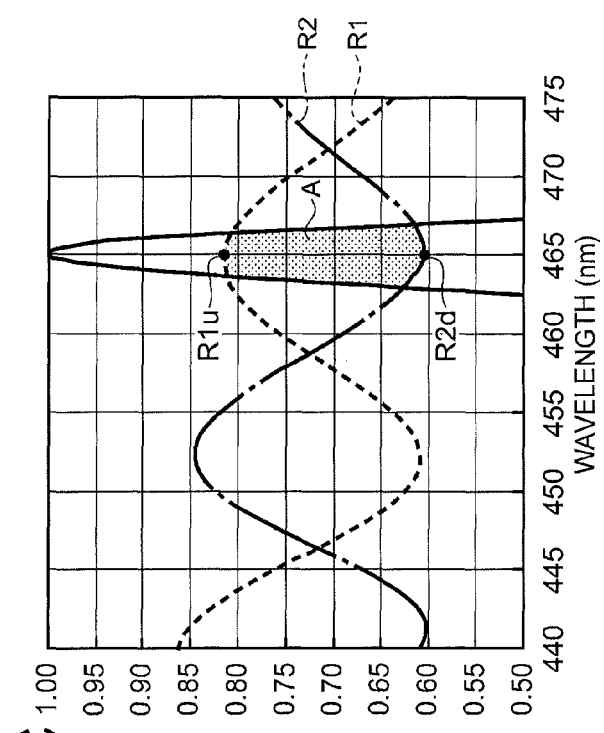
FIGS. 4A to 4D describe that interference fringes are produced in the display area of a liquid crystal panel in a case where a laser light source of related art is used.
Figure 4C:
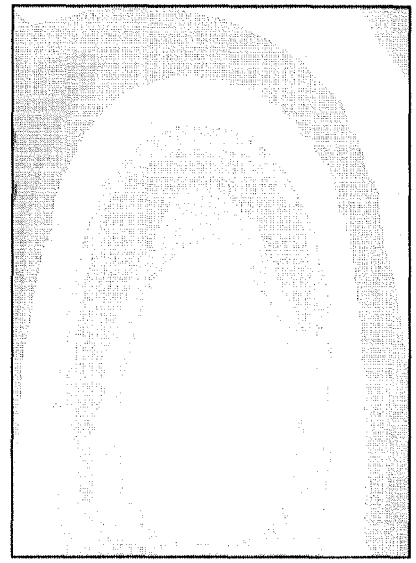
Figure 4B:
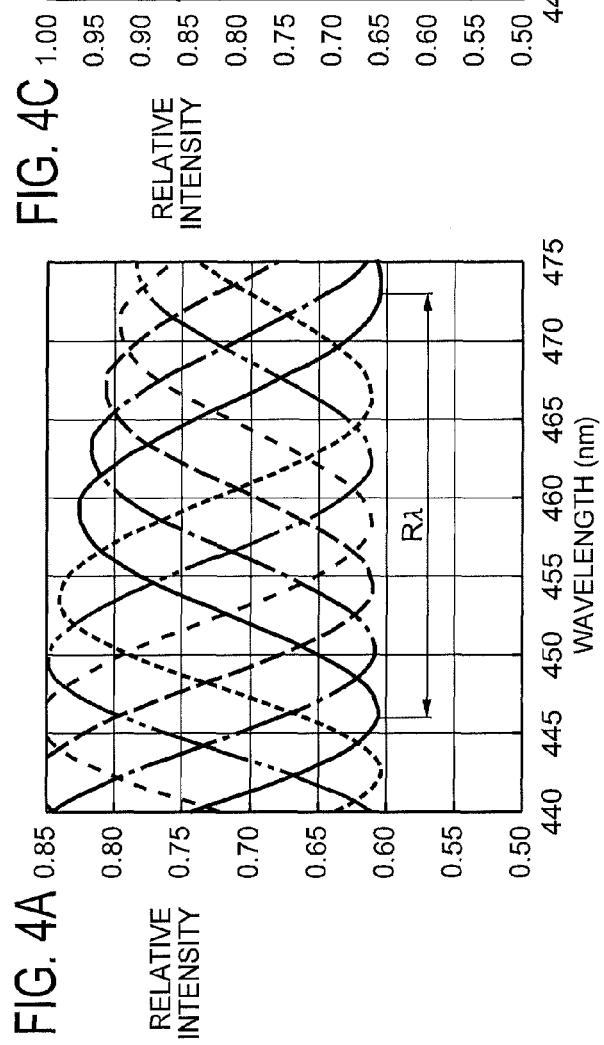
Figure 4D:
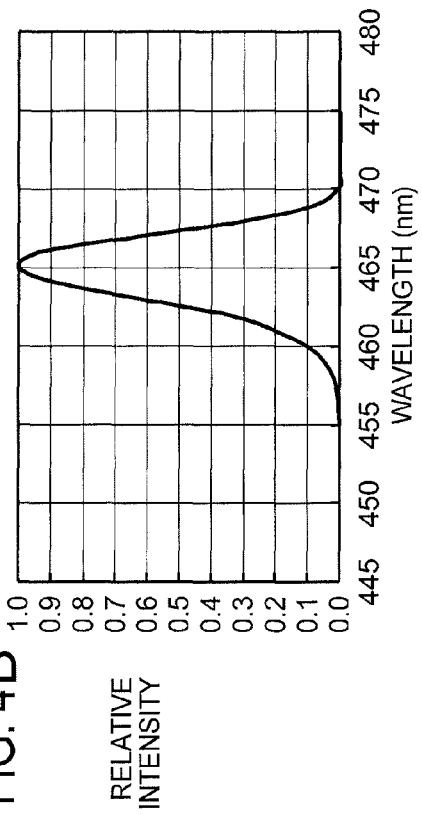

FIGS. 4A to 4D describe that interference fringes are produced in the display area of the liquid crystal panel 50 in the case where the laser light source of related art is used. Specifically, FIG. 4A shows exemplary optical spectra of the reflected light Lr in the liquid crystal panel 50. FIG. 4B shows an exemplary spectrum of light outputted from the light source apparatus of related art. FIG. 4C shows the exemplary optical spectra of the reflected light Lr and the exemplary spectrum of light outputted from the light source apparatus of related art. FIG. 4D shows exemplary interference fringes in the display area of the liquid crystal panel 50.

As described above, since the intensity of the reflected light Lr at each wavelength varies when the film thickness of any of the members that form the liquid crystal panel 50 varies, in the display area of the liquid crystal panel 50, a large number of ripples having different intensities are produced at the same wavelength in accordance with variation in thickness of any of the members that form the liquid crystal panel 50, as shown in FIG. 4A. For example, the ripples have a wavelength of about 26 nm (wavelength of one cycle of ripple: ripple wavelength Rλ) in a range from 440 nm to 475 nm of the optical spectra of the ripples, as shown in FIG. 4A.

When a laser light source that emits narrow wavelength band light the optical intensity of which peaks at a wavelength of 465 nm is used as the light source apparatus of related art as shown in FIG. 4B, a portion where a ripple wave R1 having a peak of the wave in the vicinity of the wavelength of 465 nm is produced and a portion where a ripple wave R2 having a valley of the wave in the vicinity of the wavelength of 465 nm produce a maximum difference in optical intensity, as shown in FIG. 4C. That is, the light outputted from the light source apparatus of related art and reflected in the liquid crystal panel 50 produces light formed of high intensity light R1u, which forms a peak of the ripple wave R1, and light formed of low intensity light R2d, which forms a valley of the ripple wave R2, with the two types of light outputted from different positions in the display area of the liquid crystal panel 50, as shown in FIG. 4C. The difference in optical intensity is indicated by a region A surrounded by the ripple wave R1 and the ripple wave R2 in the spectrum of the light outputted from the light source apparatus, as shown in FIG. 4C. Interference fringes (fringe-like pattern (bright portions and dark portions)) are then produced in the display area of the liquid crystal panel 50 in correspondence with the magnitude of light having exited out thereof, as shown in FIG. 4D. Interference fringes are thus produced in the display area of the liquid crystal panel 50 when the incident light produces ripples in the reflected light (exiting light).

Now, consider a case where the light source apparatus of related art is used to display blue of an intermediate grayscale, and measure maximum brightness Ymax and minimum brightness Ymin in the projected image. Brightness unevenness is then calculated by using the following Expression (3) to be 0.187.

$$\text{Brightness unevenness} = (Y\text{max} - Y\text{min})/(Y\text{max} + Y\text{min}) \quad (3)$$

Further, consider a case where the light source apparatus of related art is used to display gray of an intermediate grayscale, and calculate color unevenness on a chromaticity u'v' diagram defined by CIE (Commission Internationale de l'Eclairage). Specifically, maximum chromaticity u'max, v'max and minimum chromaticity u'min, v'min in the projected image are measured, and color unevenness is calculated by using the following Expression (4) to be 0.027.

$$\Delta u'v' = \sqrt{((u'\text{max} - u'\text{min})^2 + (v'\text{max} - v'\text{min})^2)} \quad (4)$$

As described above, when the light source apparatus of related art is used, large amounts of brightness unevenness and color unevenness occur, and a viewer recognizes the two types of unevenness.

A description will next be made of a case where the first light source apparatus 11 in the present embodiment is used.

Figure 5:
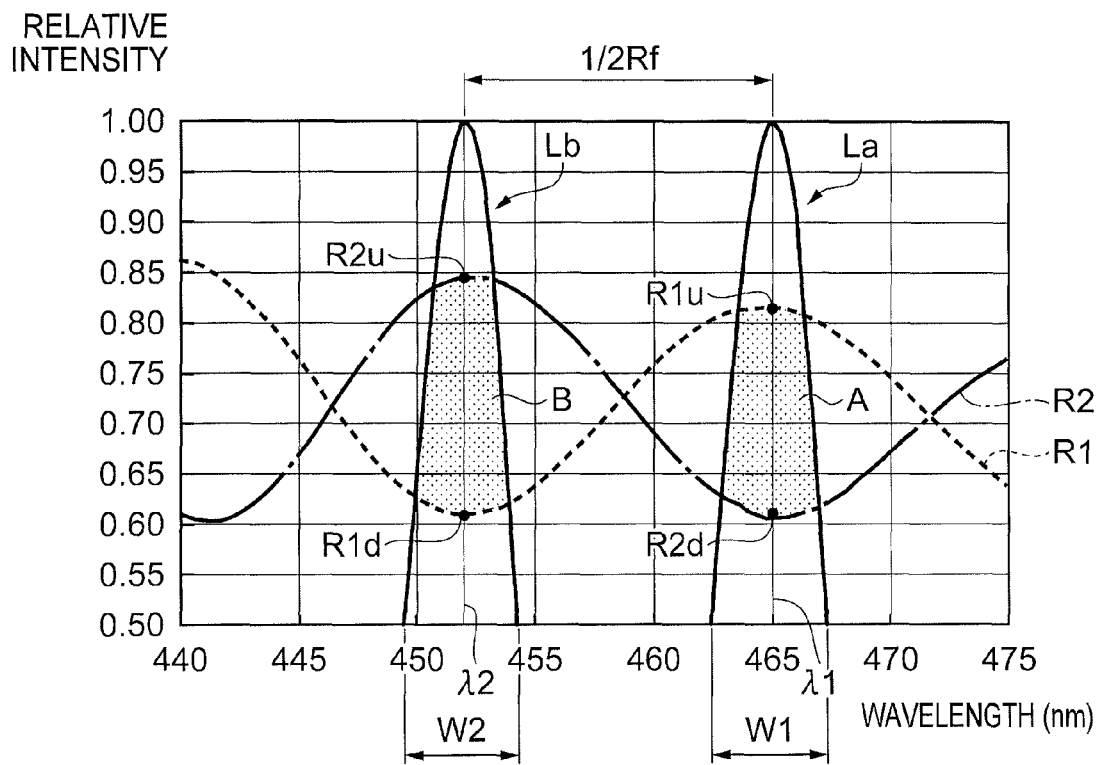
FIG. 5 shows optical spectra of reflected light and the spectrum of the light outputted from the first light source apparatus.

FIG. 5 shows optical spectra of the reflected light Lr and the spectrum of the light outputted from the first light source apparatus 11.

As shown in FIG. 5, the first light source apparatus 11 outputs light formed of the first light La and the second light Lb, as described above. The separation between the first wavelength λ1 at which the optical intensity of the first light La peaks and the second wavelength λ2 at which the optical intensity of the second light Lb peaks (hereinafter referred to as "wavelength separation") is set at a value greater than ¼ of the ripple wavelength Rλ of a ripple among the ripples contained in the optical spectrum of the reflected light Lr, specifically, the ripple that falls within the region of the wavelengths of the first light La and the second light Lb (regions in the vicinity of the first wavelength λ1 and the second wavelength λ2) but smaller than ¾ of the ripple wavelength Rλ.

A description will first be made of a case where a plurality of laser light sources are so combined with one another that the wavelength separation is about ½ (about 13 nm) of the ripple wavelength Rλ (about 26 nm). Specifically, the first light source apparatus 11 is, for example, so configured that the first wavelength λ1 is set at about 465 nm and the second wavelength λ2 is set at about 452 nm, and the first light source apparatus 11 outputs light so configured that the optical intensity at the first wavelength λ1 and the optical intensity at the second wavelength λ2 are substantially equal to each other, as shown in FIG. 5.

Further, the first light La is set to have a narrow wavelength band of a width of about 5 nm over which the optical intensity is at least one-half the optical intensity at the first wavelength λ1 (effective wavelength region W1). Similarly, the second light Lb is set to have a narrow wavelength band of a width of about 5 nm over which the optical intensity is at least one-half the optical intensity at the second wavelength λ2 (effective wavelength region W2).

Each of the effective wavelength regions W1 and W2 may be 10 nm or narrower.

As shown in FIG. 5, in the portion of the display area of the liquid crystal panel 50 where the ripple wave R1 is produced, the first light La incident on the portion forms exiting light formed of the high intensity light R1u corresponding to a peak of the ripple wave R1, and the second light Lb incident on the portion forms exiting light formed of low intensity light R1d corresponding to a valley of the ripple wave R1.

Further, in the portion of the display area of the liquid crystal panel 50 where the ripple wave R2 is produced, the first light La forms exiting light formed of the low intensity light R2d corresponding to a valley of the ripple wave R2, and the second light Lb forms exiting light formed of high intensity light R2u corresponding to a peak of the ripple wave R2.

The difference in optical intensity in the display area of the liquid crystal panel 50 is therefore the difference in area between a region A surrounded by the ripple wave R1 and the ripple wave R2 in the spectrum of the outputted first light La and a region B surrounded by the ripple wave R1 and the ripple wave R2 in the spectrum of the outputted second light Lb, as shown in FIG. 5. The difference is significantly smaller than the difference in the case where the light source apparatus of related art is used (see FIG. 4C) or the difference indicated by the region A, whereby interference fringes in the display area of the liquid crystal panel 50 is suppressed.

Now, blue of an intermediate grayscale is displayed, and the maximum brightness Ymax and the minimum brightness Ymin are measured in the projected image. Brightness unevenness is then calculated by using Expression (3) described above to be 0.039.

Further, gray of an intermediate grayscale is displayed, and the maximum chromaticity u'max, v'max and the minimum chromaticity u'min, v'min are measured in the projected image. Color unevenness is then calculated by using Expression (4) described above to be 0.007.

As described above, when the first light source apparatus 11 is used, the amounts of brightness unevenness and color unevenness are smaller than those in the case where the light source apparatus of related art is used, and the viewer hardly recognizes the two types of unevenness.

The first light source apparatus 11, which is a combination of a plurality of laser light sources, can be configured to output light having an emitted light spectrum different from the emitted light spectrum described above.

A description will next be made of cases where the first light source apparatus 11 is so configured that the wavelength separation is about ⅜ and about ⅝ of the ripple wavelength Rλ.

Figure 6A:
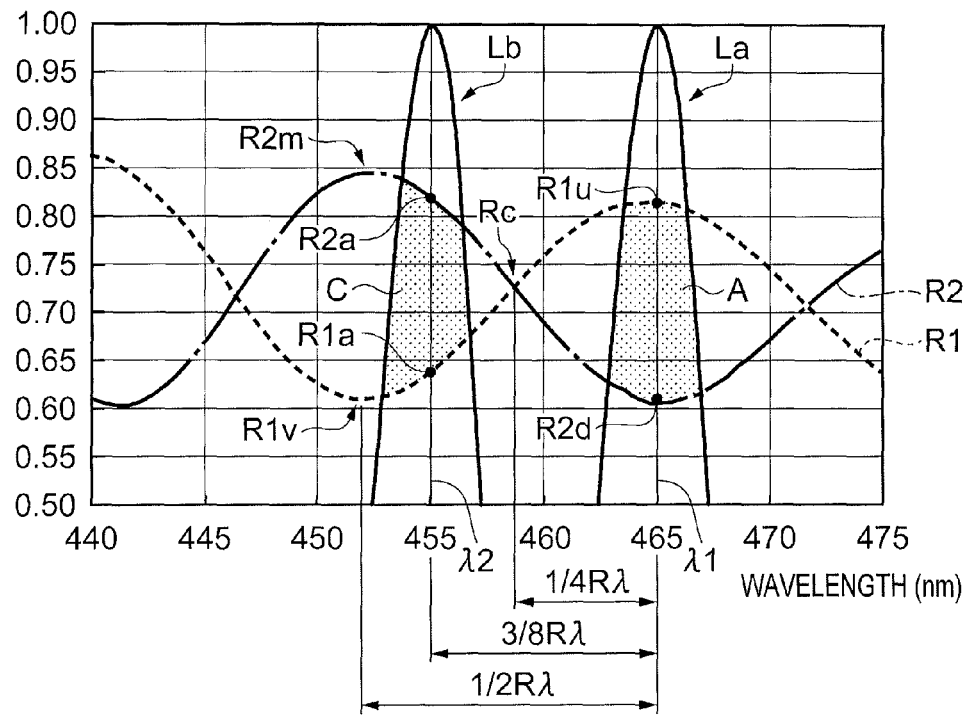
FIGS. 6A and 6B show optical spectra of reflected light and the spectrum of the light outputted from the first light source apparatus.
Figure 6B:
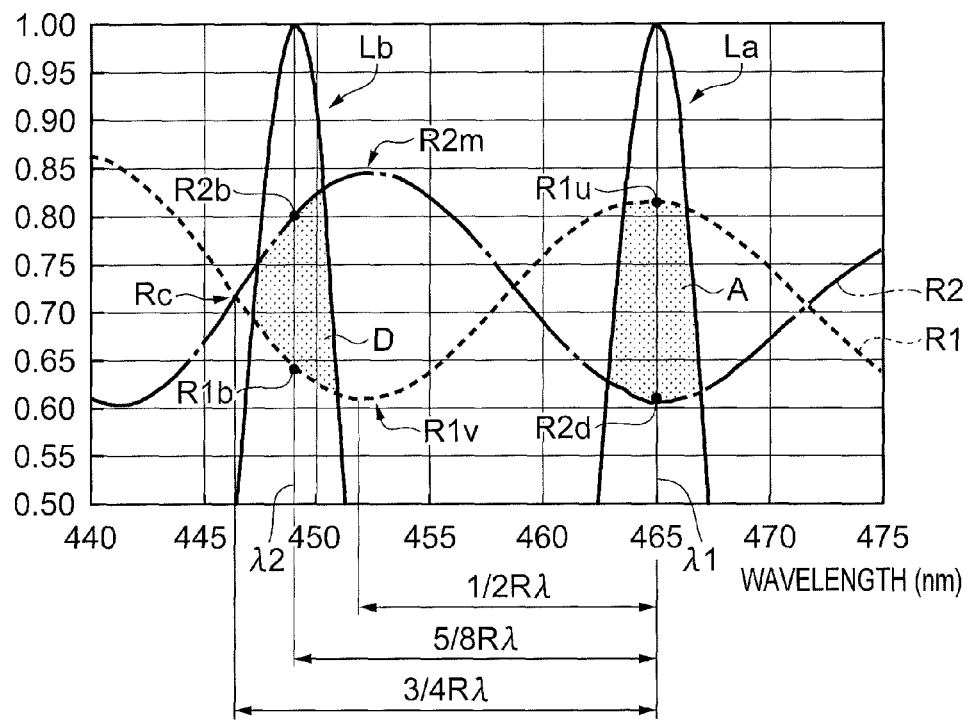

FIGS. 6A and 6B show optical spectra of the reflected light Lr and the spectrum of the light outputted from the first light source apparatus 11. FIG. 6A shows a case where the first light source apparatus 11 is so configured that the wavelength separation is about ⅜ of the ripple wavelength Rλ, and FIG. 6B shows a case where the first light source apparatus 11 is so configured that the wavelength separation is about ⅝ of the ripple wavelength Rλ.

As shown in FIG. 6A, when the first light source apparatus 11 is so configured that the wavelength separation is ⅜ of the ripple wavelength Rλ (for example, when λ1≈465 nm and λ2≈455 nm), the following light exits out of the liquid crystal panel 50.

That is, in the portion of the display area of the liquid crystal panel 50 where the ripple wave R1 is produced, the first light La incident on the portion forms exiting light formed of the high intensity light R1u corresponding to a peak of the ripple wave R1, and the second light Lb incident on the portion forms exiting light formed of light R1a.

The light R1a is light of the second wavelength λ2 and has optical intensity in a position on the ripple wave R1 between a valley R1v of the ripple wave R1 and an intermediate position Rc on the ripple wave R1 where the amplitude thereof is zero. The optical intensity is higher than the intensity corresponding to the valley R1v but lower than the intensity corresponding to the intermediate position Rc, as shown in FIG. 6A.

Further, in the portion of the display area of the liquid crystal panel 50 where the ripple wave R2 is produced, the first light La incident on the portion forms exiting light formed of the low intensity light R2d corresponding to a valley of the ripple wave R2, and the second light Lb incident on the portion forms exiting light formed of light R2a.

The light R2a is light of the second wavelength λ2 and has optical intensity in a position on the ripple wave R2 between a peak R2m of the ripple wave R2 and the intermediate position Rc. The optical intensity is lower than the intensity corresponding to the peak R2m but higher than the intensity corresponding to the intermediate position Rc, as shown in FIG. 6A.

The difference in optical intensity in the display area of the liquid crystal panel 50 is therefore the difference in area between the region A surrounded by the ripple wave R1 and the ripple wave R2 in the spectrum of the outputted first light La and a region C surrounded by the ripple wave R1 and the ripple wave R2 in the spectrum of the outputted second light Lb, as shown in FIG. 6A. The difference is greater than the difference in the case where the wavelength separation is ½ of the ripple wavelength Rλ (see FIG. 5) but smaller than the difference in the case where the light source apparatus of related art is used (see FIG. 4C) or the difference indicated by the region A, whereby interference fringes in the display area of the liquid crystal panel 50 are suppressed.

As shown in FIG. 6B, when the first light source apparatus 11 is so configured that the wavelength separation is ⅝ of the ripple wavelength Rλ (for example, when λ1≈465 nm and λ2≈449 nm), the following light exits out of the liquid crystal panel 50.

That is, in the portion of the display area of the liquid crystal panel 50 where the ripple wave R1 is produced, the first light La incident on the portion forms exiting light formed of the high intensity light R1u, and the second light Lb incident on the portion forms exiting light formed of light R1b.

The light R1b has optical intensity in a position on the ripple wave R1 between the valley R1v of the ripple wave R1 and the intermediate position Rc, and the optical intensity is higher than the intensity at the valley R1v but lower than the intensity in the intermediate position Rc, as shown in FIG. 6B.

Further, in the portion of the display area of the liquid crystal panel 50 where the ripple wave R2 is produced, the first light La incident on the portion forms exiting light formed of the low intensity light R2d, and the second light Lb incident on the portion forms exiting light formed of light R2b.

The light R2b has optical intensity in a position on the ripple wave R2 between the peak R2m of the ripple wave R2 and the intermediate position Rc, and the optical intensity is lower than the intensity at the peak R2m but higher than the intensity in the intermediate position Rc, as shown in FIG. 6B.

The difference in optical intensity in the display area of the liquid crystal panel 50 is therefore the difference in area between the region A surrounded by the ripple wave R1 and the ripple wave R2 in the spectrum of the outputted first light La and a region D surrounded by the ripple wave R1 and the ripple wave R2 in the spectrum of the outputted second light Lb, as shown in FIG. 6B. The difference is greater than the difference in the case where the wavelength separation is ½ of the ripple wavelength Rλ (see FIG. 5) but smaller than the difference in the case where the light source apparatus of related art is used (see FIG. 4C) or the difference indicated by the region A, whereby interference fringes in the display area of the liquid crystal panel 50 are suppressed.

When the wavelength separation is set at a value smaller than ⅜ of the ripple wavelength Rλ but greater than ¼ thereof, the optical spectra of the reflected light Lr and the spectrum of the light outputted from the first light source apparatus 11 are so changed that the region C shown in FIG. 6A is moved toward the intermediate position Rc. That is, the region C surrounded by the ripple wave R1 and the ripple wave R2 in the spectrum of the outputted second light Lb gradually decreases as the wavelength separation decreases from ⅜ of the ripple wavelength Rλ toward ¼ thereof, and when the wavelength separation is so set that the intermediate position Rc falls within the spectrum of the outputted second light Lb, the region C is formed on opposite sides of the intermediate position Rc (not shown).

The region C provided on opposite sides of the intermediate position Rc is formed of a first region C1 (not shown) surrounded by a low optical intensity portion of the ripple wave R1 and a higher optical intensity portion of the ripple wave R2 and a second region C2 (not shown) surrounded by a low optical intensity portion of the ripple wave R2 and a higher optical intensity portion of the ripple wave R1. Since the wavelength separation is greater than ¼ of the ripple wavelength Rλ, the first region C1 is greater than the second region C2. That is, in the case where the wavelength separation is set at a value smaller than ⅜ of the ripple wavelength Rλ but greater than ¼ thereof, light corresponding to the second light Lb (light in region C) has lower optical intensity ripple R1 and higher optical intensity ripple R2.

When the wavelength separation is set at a value smaller than ⅜ of the ripple wavelength Rλ but greater than ¼ thereof, a case where the wavelength separation is so set that the intermediate position Rc does not fall within the spectrum of the outputted second light Lb is called a single region formation state, and a case where the wavelength separation is so set that the intermediate position Rc falls within the spectrum of the outputted second light Lb is called a multiple region formation state. Further, the difference between the first region C1 and the second region C2 is called a difference region C3.

In the single region formation state, the difference in optical intensity in the display area of the liquid crystal panel 50 is the difference in area between the region A shown in FIG. 6A and the region C in the single region formation state, and in the multiple region formation state, the difference in optical intensity is the difference in area between the region A shown in FIG. 6A and the difference region C3.

The difference in optical intensity in each of the single region formation state and the multiple region formation state is greater than the difference in the case where the wavelength separation is ⅜ of the ripple wavelength Rλ but smaller than the difference in the case where the light source apparatus of related art is used or the difference indicated by the region A (see FIG. 4C).

Further, when the wavelength separation is set at a value greater than ⅜ of the ripple wavelength Rλ, but smaller than ½ thereof, the difference in optical intensity in the display area of the liquid crystal panel 50 is closer to the difference indicated by the region B shown in FIG. 5 than the difference indicated by the region C shown in FIG. 6A, whereby the difference in optical intensity is smaller than in the case where the wavelength separation is set at ⅜ of the ripple wavelength Rλ.

Further, when the wavelength separation is set at a value greater than ½ of the ripple wavelength Rλ but smaller than ⅝ thereof, the difference in optical intensity in the display area of the liquid crystal panel 50 is closer to the difference indicated by the region B shown in FIG. 5 than the difference indicated by the region D shown in FIG. 6B, whereby the difference in optical intensity is smaller than in the case where the wavelength separation is set at ⅝ of the ripple wavelength Rλ.

When the wavelength separation is set at a value greater than ⅝ of the ripple wavelength Rλ but smaller than ¾ thereof, the optical spectra of the reflected light Lr and the spectrum of the light outputted from the first light source apparatus 11 are so changed that the region D shown in FIG. 6B is moved toward the intermediate position Rc. That is, the region D surrounded by the ripple wave R1 and the ripple wave R2 in the spectrum of the outputted second light Lb gradually decreases as the wavelength separation increases from ⅝ of the ripple wavelength Rλ, toward ¾ thereof, and when the wavelength separation is so set that the intermediate position Rc falls within the spectrum of the outputted second light Lb, the region D is formed on opposite sides of the intermediate position Rc (not shown).

The region D formed on opposite sides of the intermediate position Rc is formed of a third region D3 (not shown) surrounded by a low optical intensity portion of the ripple wave R1 and a higher optical intensity portion of the ripple wave R2 and a fourth region D4 (not shown) surrounded by a low optical intensity portion of the ripple wave R2 and a higher optical intensity portion of the ripple wave R1. Since the wavelength separation is smaller than ¾ of the ripple wavelength Rλ, the third region D3 is greater than the fourth region D4. That is, when the wavelength separation is set at a value greater than ⅝ of the ripple wavelength Rλ but smaller than ¾ thereof, light corresponding to the second light Lb (light in region D) has lower optical intensity ripple R1 and higher optical intensity ripple R2.

When the wavelength separation is set at a value greater than ⅝ of the ripple wavelength Rλ but smaller than ¾ thereof, a case where the wavelength separation is so set that the intermediate position Rc does not fall within the spectrum of the outputted second light Lb is called a single region formation state, and a case where the wavelength separation is so set that the intermediate position Rc falls within the spectrum of the outputted second light Lb is called a multiple region formation state. Further, the difference between the third region D3 and the fourth region D4 is called a difference region D5.

In the single region formation state, the difference in optical intensity in the display area of the liquid crystal panel 50 is the difference in area between the region A shown in FIG. 6B and the region D in the single region formation state, and in the multiple region formation state, the difference in optical intensity is the difference in are between the region A shown in FIG. 6B and the difference region D5.

The difference in optical intensity in each of the single region formation state and the multiple region formation state is greater than the difference in the case where the wavelength separation is 5/8 of the ripple wavelength Rλ but smaller than the difference in the case where the light source apparatus of related art is used or the difference indicated by the region A (see FIG. 4C).

As described above, when the wavelength separation is set at a value greater than 1/4 of the ripple wavelength Rλ but smaller than the 3/4 thereof, the difference in optical intensity in the display area of the liquid crystal panel 50 is smaller than the difference in the case where the light source apparatus of related art is used, whereby interference fringes in the display area of the liquid crystal panel 50 are suppressed.

In a light source apparatus of related art having laser light sources as well, interference fringes in the liquid crystal panel 50 can be suppressed if the effective wavelength region of the light emitted from each of the laser light sources can be significantly widened. The effective wavelength region of the light emitted from a single laser light source is, however, very narrow or as narrow as about 1 nm, and quite a large number of laser light sources are required to widen the effective wavelength region. In contrast, the light source apparatus 11 in the embodiment of the invention is so configured that the width of each of the effective wavelength regions W1 and W2 is set at 10 nm or smaller, whereby reduction in the number of laser light sources can suppress an increase in size of the first light source apparatus 11 and simplify the manufacture of the first light source apparatus 11. Further, it can be said based on the above description that providing the first light La and the second light Lb allows suppression of interference fringes in the liquid crystal panel 50.

Further, in the embodiment described above, the case where the ripple wavelength Rλ is about 26 nm is presented by way of example, interference fringes in the liquid crystal panel 50 can also be suppressed based on a ripple wavelength Rλ shorter than 26 nm to the extent that the first wavelength λ1 and the second wavelength λ2 can be so set that the intensities of the first light La and the second light Lb peak at the first wavelength λ1 and the second wavelength λ2 respectively.

For example, although not shown in a figure in detail, when the first light La and the second light Lb have effective wavelength regions W1 and W2 of 10 nm, setting the wavelength separation at a value greater than 10 nm allows the intensities of the first light La and the second light Lb to peak at the first wavelength λ1 and the second wavelength λ2 respectively. Specifically, considering that the wavelength separation is greater than 1/4 of the ripple wavelength Rλ but smaller than 3/4 thereof, interference fringes in each of the light modulators can be suppressed by setting the ripple wavelength Rλ at a value greater than or equal to about 14 nm. Further, when the effective wavelength regions W1 and W2 are smaller than 10 nm, interference fringes in the liquid crystal panel 50 can be suppressed by setting the ripple wavelength Rλ at a further smaller value.

The G light and the R light outputted from the second light source apparatus 21 and incident on the liquid crystal light valves 5G and 5R each have a wideband wavelength significantly wider than the ripple wavelength Rλ, whereby interference fringes are hardly produced in the liquid crystal panel 50 in each of the liquid crystal light valves 5G and 5R.

As described above, the first light source apparatus 11 outputs light formed of the first light La and the second light Lb, which are separated by the wavelength separation greater than 1/4 of the ripple wavelength Rλ but smaller than 3/4 thereof and which have the effective wavelength regions W1 and W2 smaller than or equal to 10 nm, whereby interference fringes in the liquid crystal panel 50 are suppressed.

As described above, the present embodiment can provide the following advantageous effects.

(1) Since interference fringes in the liquid crystal panel 50 are suppressed, the projector 100 can project an image with brightness unevenness and color unevenness suppressed.

(2) Since the liquid crystal panel 50, which is of reflective type or uses reflected light, is used as each of the light modulators, interference fringes in the display area of the liquid crystal panel 50 can be suppressed and hence brightness unevenness and color unevenness of a projected image can be suppressed in a more efficient manner.

(3) Since the first light source apparatus 11 uses a plurality of laser light sources to emit light firmed of the first light La and the second light Lb, the first light source apparatus 11 can have a prolonged life and can output light that provides a wavelength separation set to be greater than 1/4 of the ripple wavelength Rλ, but smaller than 3/4 thereof.

(4) Since each of the effective wavelength regions W1 and W2 is set at 10 nm or narrower, interference fringes resulting from ripples having ripple wavelengths Rλ, greater than or equal to 14 nm can be suppressed in the liquid crystal panel 50.

(5) Since the projector 100 includes the first light source apparatus 11, which outputs the B light (first color light), and the second light source apparatus 21, which outputs the G light (second color light) and the R light, the intensity of each of the color light beams can be readily controlled.

Further, in the liquid crystal panel 50 in the liquid crystal light valve 5B (first light modulator), interference fringes are suppressed by the light formed of the first light La and the second light Lb, and in the liquid crystal panel 50 in each of the liquid crystal light valves 5G and 5R, which is irradiated with light of wideband wavelength, substantially no interference fringes are produced.

Therefore, the color light beams can be satisfactorily balanced in terms of intensity, and a projector capable of projecting an image with brightness unevenness and color unevenness suppressed can be provided.

Variations

The embodiment described above may be changed as follows.

In the embodiment described above, the light formed of the first light La and the second light Lb forms the B light, but the light formed of the first light La and the second light Lb may form light other than the B light, for example, may form the G light or the R light. Further, the light is not necessarily formed of a single color but may be formed of a plurality of colors.

The first light source apparatus 11 is a combination of a plurality of laser light sources and is configured to output light formed of the first light La and the second light Lb, but any light source that is not a laser light source but emits narrow wavelength band light as described above may be used.

The projector 100 according to the embodiment described above uses the reflective liquid crystal panel 50 as each of the light modulators but may instead use a transmissive liquid crystal panel. In a transmissive liquid crystal panel, part of light incident thereon is also reflected off the layers of members that form the liquid crystal panel, and ripples are produced accordingly. Therefore, even when a transmissive liquid crystal panel is used, interference fringes in the liquid crystal panel can be suppressed.

Further, each of the light modulators is not limited to a liquid crystal panel and may be a modulator configured to cause reflected light beams to interfere with each other in a process of modulating incident light.

In the embodiment described above, the optical intensity at the first wavelength λ1 and the optical intensity at the second wavelength λ2 are set at substantially the same value, but the optical intensity at the first wavelength λ1 and the optical intensity at the second wavelength λ2 may be set at values different from each other. In particular, when the light formed of the first light La and the second light Lb is the B light, it is conceivable that the second wavelength λ2 (shorter wavelength) contains ultraviolet wavelengths. Setting the optical intensity at the second wavelength λ2 to be lower than the optical intensity at the first wavelength λ1 (longer wavelength) therefore allows suppression of degradation of the liquid crystal panel due to ultraviolet light while suppressing brightness unevenness and color unevenness of a projected image.

Further, an adjuster capable of adjusting the optical intensity at the first wavelength λ1 and the optical intensity at the second wavelength λ2 may be provided.

Each of the first optical integration system 13 and the second optical integration system 23 in the embodiment described above may be replaced with a rod lens that allows light beams incident thereon to undergo multi beam reflection at the inner surface of the rod lens.

The entire disclosure of Japanese Patent Application No. 2013-215266, filed Oct. 16, 2013 and Japanese Patent Application No. 2014-123131, filed Jun. 16, 2014 are expressly incorporated by reference herein.

What is claimed is:

1. A projector comprising:
   a light source apparatus that outputs light;
   a light modulator that modulates the light outputted from the light source apparatus in accordance with image information; and
   a projection system that projects light modulated by the light modulator,
   wherein the light source apparatus outputs light formed of first light the optical intensity of which peaks at a first wavelength and second light the optical intensity of which peaks at a second wavelength, and
   the separation between the first wavelength and the second wavelength is set at a value greater than ¼ of one-cycle wavelength of a ripple among ripples contained in an optical spectrum of light that results from the light incident on the light modulator and exits out thereof, the ripple falling within regions in the vicinity of the first wavelength and the second wavelength, but smaller than ¾ of the one-cycle wavelength.

2. The projector according to claim 1, wherein the light modulator is a liquid crystal panel.

3. The projector according to claim 2, wherein the light modulator is a reflective liquid crystal panel.

4. The projector according to claim 1, wherein the light source apparatus includes a laser light source that emits the first light and a laser light source that emits the second light.

5. The projector according to claim 1, wherein the first wavelength and the second wavelength are within a wavelength region to which blue light belongs.

6. The projector according to claim 1, wherein the first light has a wavelength band of a width of 10 nm or smaller over which the optical intensity is at least one-half the optical intensity at the first wavelength, and
the second light has a wavelength band of a width of 10 nm or smaller over which the optical intensity is at least one-half the optical intensity at the second wavelength.

7. The projector according to claim 1, wherein the light source apparatus includes
a first light source apparatus having a first light source that emits first color light formed of the first light and the second light and a light diffuser that diffuses the first color light emitted from the first light source, and
a second light source apparatus having a second light source that emits excitation light and a fluorophore that converts the excitation light into light containing second color light, and
the light modulator includes
a first light modulator that modulates the first color light and a second light modulator that modulates the second color light.

* * * * *